(12) United States Patent
Dietrich, Sr.

(10) Patent No.: US 8,544,395 B2
(45) Date of Patent: Oct. 1, 2013

(54) SLURRY FERTILIZER APPLICATOR

(76) Inventor: William J. Dietrich, Sr., Goodfield, IL (US)

( * ) Notice: Subject to any disclaimer, the term of this patent is extended or adjusted under 35 U.S.C. 154(b) by 373 days.

(21) Appl. No.: 12/902,983

(22) Filed: Oct. 12, 2010

(65) Prior Publication Data

US 2012/0085273 A1 Apr. 12, 2012

(51) Int. Cl.
*A01C 23/02* (2006.01)
(52) U.S. Cl.
USPC .......................................................... 111/121
(58) Field of Classification Search
USPC ........... 111/118, 121–124, 156, 157; 405/51, 405/128.1, 130, 270, 258.1; 239/201, 207
See application file for complete search history.

(56) References Cited

U.S. PATENT DOCUMENTS

| | | |
|---|---|---|
| 4,592,294 A | 6/1986 | Dietrich, Sr. et al. |
| 4,834,189 A | 5/1989 | Peterson et al. |
| 5,357,883 A | 10/1994 | Depault |
| 5,566,627 A | 10/1996 | Pryor |
| 5,865,131 A | 2/1999 | Dietrich, Sr. et al. |
| 6,973,884 B2 | 12/2005 | Dietrich, Sr. |

*Primary Examiner* — Christopher J Novosad
(74) *Attorney, Agent, or Firm* — Greer, Burns & Crain, Ltd.

(57) ABSTRACT

An applicator unit for applying slurry fertilizer beneath the soil with reduced soil displacement includes a spring-cushioned main mounting shank and a forward spring-biased coulter. A narrow applicator shank, mounted to the main mounting shank just above the surface of the soil, is oriented generally upright and includes a leading nose portion having a small low angle forward protruding tip and a tapered leading edge for forming a furrow without tilling the soil. The furrow is formed in four stages: by the small low angle forward protruding tip, the upright tapered leading edge of the sweep shank, by a bulge on each side of the casting near the soil surface, a slurry tube widens the slot further, facilitating the delivery of the slurry in the vertical slot. Swept back wings gently lift the soil to allow horizontal distribution of the slurry.

16 Claims, 5 Drawing Sheets

SLURRY FERTILIZER APPLICATOR

FIELD OF THE INVENTION

Figure 1:
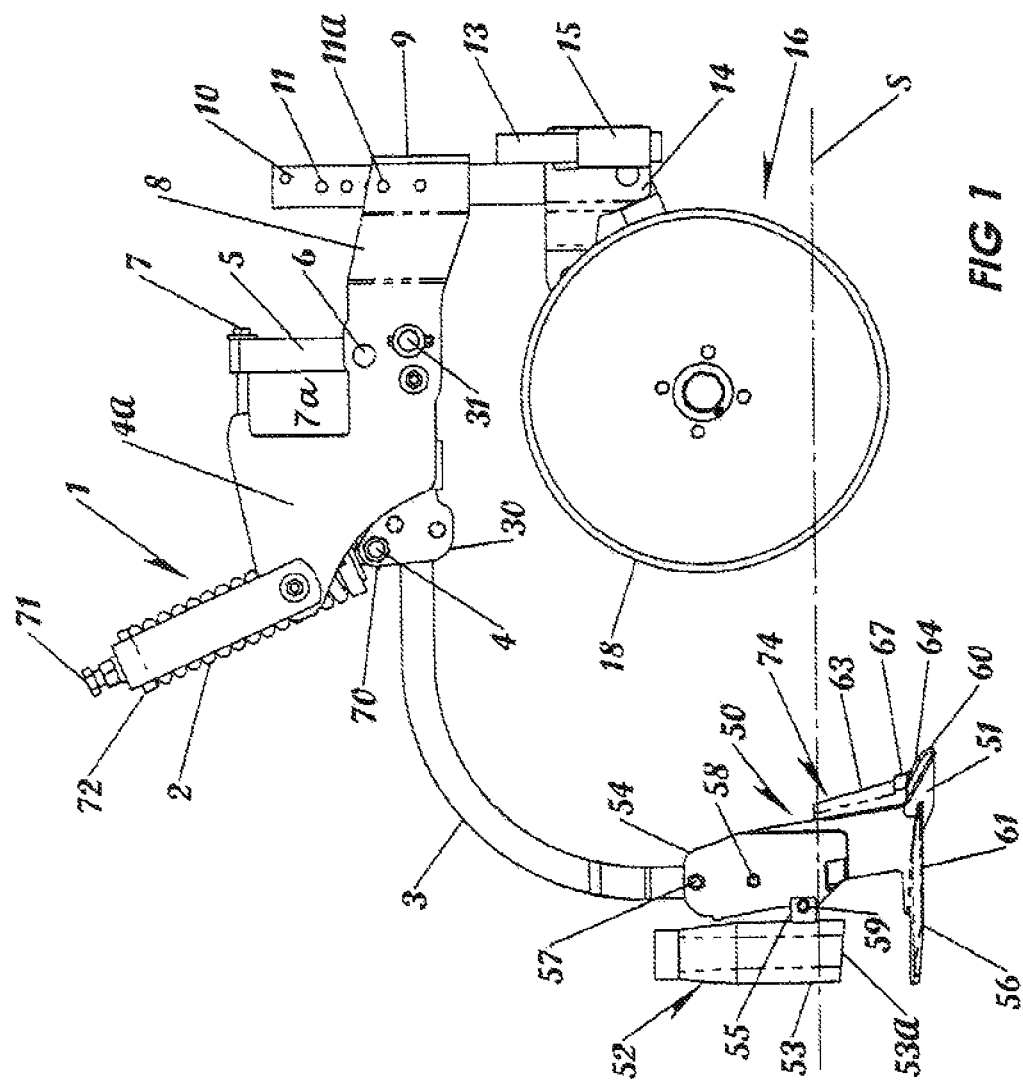

The present invention relates to agricultural fertilizer applicators; and more particularly, it relates to apparatus for subsoil application of livestock waste in the form of a slurry (that is, a freely flowable mixture of liquids and solids).

BACKGROUND OF THE INVENTION

Historically, livestock waste, particularly in solid form, has been spread on the surface of the soil by a manure spreader using a flail to fling the material to the rear. A more modern side-discharge spreader also deposits the material on the surface of the soil.

The advent of confinement systems for animals which include pits below the confinement area produces a large amount of animal waste in a slurry form which must be handled and disposed of. Typically, the slurry is pumped in a large tank carried by a wagon, but originally it was for the most part, spread or sprayed on the surface of the soil.

This procedure has, as a principal objection, a strong odor which remains after the waste is spread. Moreover, surface spreading of animal waste is not desirable with the potential runoff of nitrates and phosphorus into rivers and streams or seeping of the material into ground water sources. This is objectionable because livestock waste is high in nitrogen, and swine waste is also high in phosphorus and with increasing concern with the quality of drinking water, this procedure is becoming less and less acceptable.

Various methods have been proposed for depositing the slurry underground. One method is to use a fertilizer knife, such as shown in U.S. Pat. No. 4,592,294 and to weld a large pipe to the rear of the knife to deliver the slurry behind the knife and into the slot cut in the soil by the knife. This leaves a very narrow band of fertilizer having a high concentration of nitrogen and other nutrients.

Another method of subsoil delivery of animal waste employs a standard chisel plow shank with an attached wide cultivator sweep, in an attempt to distribute the slurry further laterally and to avoid the concentration which occurs in the case of a simple fertilizer knife, described above.

This method, however, presents still another problem—namely, the cultivator sweep unnecessarily tills the soil and may result in burying surface residue. This may be a separate problem, particularly for farmers whose land may have been designated HEI, because there are federal requirements to maintain a certain percentage of crop residue on the surface of such soil. Both the chisel plow shank (which is a wide shank) and cultivator sweeps are designed to create a plowing action that mixes the soil with the residue, buries a large percentage of the residue, and leaves a furrow of exposed liquid behind the shank.

A more recent improvement is disclosed in U.S. Pat. No. 5,865,131. This device uses a spring-cushioned coulter running ahead of the applicator for cutting an initial slot in the residue and providing a break line in the soil to be parted by a trailing shank. The shank spreads the initial slot and deepens it. The shank includes a shoe provided with a pair of wings extended laterally. The shoe is in the form of a tillage point which fractures and lifts the soil in front of the shank. The wings lift the soil laterally of the shank from the center toward the outward ends of the wings to provide slots for promoting lateral distribution of the slurry.

The applicator of the '131 patent is suitable for delivering higher application rates of slurry, in the range of 9,000 to 10,000 or more gallons per acre. However, the ground speed of the '131 patent is limited to a range of 3-5 miles per hour. At these slower speeds, the soil is lifted sufficient to form lateral fissures in the soil at a depth of approximately 3 to 4 inches which permits the slurry to flow laterally of the applicator shank. Any greater speed would cause too much soil disruption, lifting and redistribution (i.e. tillage) due to the use of a forward portion of the shoe which acts like a plow point, having a surface which is inclined upwardly and rearwardly for fracturing and lifting the soil in front of the shank. Another recent implement is disclosed in U.S. Pat. No. 6,973,884. The current invention is an improvement of the '884 patent.

SUMMARY OF THE INVENTION

The present invention is designed for the wide variation of rates for slurry fertilizer, and operation at speeds in the range of 5 to 8 miles per hour. The present invention employs a spring-cushioned coulter running ahead of the applicator for cutting an initial slot in any residue and providing a vertical parting line in the soil to receive the trailing shank which mounts the ground-engaging sweep and to minimize soil disruption.

The mounting shank of the sweep is curved and extends rearwardly and downwardly of the coulter and attaches to a sweep shank at a location slightly above the surface of the soil. This permits the use of a heavier mounting shank and a narrower sweep shank. The sweep includes a shank mounted to the rear of the mounting shank. The sweep shank is thin, preferably less than about 0.5 inches in width. The sweep shank is mounted to the distal end of the mounting shank by two vertically spaced bolts, one of which is a shear bolt. The instant invention permits the sweep shank to be mounted to the main mounting shank at a location slightly above the normal ground level for operating the unit. This has the advantage that the sweep shank need not be as thick as when mounted higher, as shown in the '131 patent.

If an obstruction is encountered, the sweep shank can pivot upwardly and clear the obstruction very quickly. Thus, the sweep shank does not have to be strengthened with increased thickness to the limits required in previous longer units, allowing the sweep shank to be narrow and cause less soil displacement.

The sweep shank of the present invention is in the form of a casting and preferably includes a nose portion which may be an abrasion resistant casting mounted in front of and at the base of the sweep shank. The lower rear portion of the main mounting shank is offset so that the center line of the main mounting shank and the sweep shank may be aligned in the direction of draft. The tip casting has a width substantially the same as the sweep shank which, as indicated, is less than about 0.5 in. The lower forward portion of the sweep shank protrudes forward at a low angle. It is designed to slightly lift the soil while parting it to provide minimal soil disturbance, but rather breaks the soil and parts it at the operating depth. The upper portion of the tip casting may be tapered from a narrow leading edge to the width of the sweep shank at its rear. The lower angle forward protruding tip penetrates hard or frozen soil better than blunt tip as shown in U.S. Pat. No. 6,973,884.

First and second wings are cast to the sides of the sweep shank respectively. The wings are located at the operating depth of the unit; and they lift the soil slightly on the left and right side of the sweep shank, permitting the slurry to flow into the cavity behind the wings, without substantially lifting or turning the soil or burying surface residue.

Behind the sweep shank a slurry delivery tube is mounted to it by means of a horizontal bolt acting as a pivot. The slurry tube delivers the slurry behind the sweep shank and deposits the slurry into the narrow furrow formed by the sweep shank and horizontally as the wings lift the soil. By pivotally connecting the slurry tube to the sweep shank at a location slightly above the soil surface, if the sweep shank shear bolt does break, the slurry tube can rotate out of harm's way quickly without binding or interfering with the sweep shank as it pivots rapidly out of the way. For higher planting rates per acre, the wings of the sweep can be made wider. Also, by changing the inclination angle of the wings, the wings can lift the soil higher providing a larger cavity in the soil to accommodate more liquid fertilizer.

The improved applicator thus extends the lateral distribution of the slurry, thereby reducing high concentrations of slurry, and extends the area in which the fertilizer is available as a nutrient for plants, while permitting operation at higher ground speeds. At the same time, the surface of the soil and any residue thereon is left substantially undisturbed, even at higher ground speeds of 5-8 mph. Operation at these speeds is facilitated, without an undesired amount of soil displacement, as a result of multiple stage furrow formation and widening.

The low angle protruding tip and the lower portion of the abrasion resistant casting gently lift and part the soil. A sharp leading edge of the upper portion of the abrasion resistant casting parts the soil laterally over a narrow width.

The casting has lateral extensions near the soil surface for widening the upper portion of the furrow to receive the lower portion of the slurry discharge tube, insuring that the slurry will be contained by the furrow. Means may be provided for closing the narrow furrow formed by the shank, but the furrow is small and narrow when the furrow shank has a narrow width, as is preferred, so closing of the furrow is not normally necessary.

The invention includes novel features and a combination of elements described and illustrated fully herein. It will be understood that various modifications may be made without departing from the spirit of the invention or sacrificing any of its advantages.

BRIEF DESCRIPTION OF THE DRAWINGS

FIG. 1 is a right side elevational view of an applicator for depositing the slurry fertilizer incorporating the present invention;

FIG. 2 is a front elevational view of the applicator of FIG. 1;

FIG. 3 is a top view of the sweep shank, with the slurry tube removed for clarity;

FIG. 4 is a close-up front view of the sweep assembly and lower offset section of the main mounting shank; and FIG. 5 is a perspective view of the tip casting portion of the sweep taken from an upper, frontal and right side perspective.

DETAILED DESCRIPTION OF THE ILLUSTRATED EMBODIMENT

Referring to FIG. 1, a left side view of the overall applicator unit. Reference numeral 1 generally designates a spring reset mechanism for a single row unit of a slurry applicator. As is known, a number of such applicator units are mounted on a wagon or tool bar drawn by a tractor. The applicator units are mounted in a side-by-side relation, and spaced apart. The tool bar or frame may have its own support wheels, or be mounted to a wagon carrying the slurry. In any case, it trails a slurry wagon or container for a large amount of slurry fertilizer which is to be applied to a field. A spring 2 is compressed (i.e. preloaded) and pivotally connected to a main mounting shank 3 by a bolt 4. When a rock or other obstruction is encountered by the applicator sweep assembly 50, the main shank 3, the applicator sweep assembly, and slurry tube 52 are pivoted up and away from the obstruction. As the spring is compressed bolt 71 telescopes out of trunion 72.

The spring cushion mechanism is mounted to a conventional toolbar by shank mount plates 4*a* and a bracket 5 that pivots on bolt 6. When an upper bolt 7 is inserted, bracket 5 tightly clamps against the tool bar tool (not shown) located in the rectangular opening 7*a*, between the bracket 5 and mount plates 4*a*. At the forward portion of the mounting assembly, steel plates are formed inward. At the forward portion of plates 8 is a cross piece 9 of steel. A similar piece of steel is welded behind a coulter mount bar 10. This provides a rectangular sleeve or receptacle so that the coulter mount bar 10 can be telescoped vertically within the sleeve and pinned (see pins 11*a*) to adjust the coulter blade 18 to the desired operating depth. Additional holes 11 are provided in coulter mount bar 10 to allow for a wide range of different operating depths for the coulter.

On the lower forward portion of coulter mount bar 10 a vertical shaft 13 is welded and the forward portion of the spring-cushioned coulter assembly 14 is provided with a sleeve 15 to telescope over the shaft 13. The coulter assembly 16 including coulter blade 18 is similar to assemblies used on various agricultural tillage tools for forming a slot in the soil and for cutting residue at or near the surface. A spring 32, shown in FIG. 2, compresses to allow the coulter blade 18 to ride over rocks and obstructions and then be reset to the desired operating depth. The coulter assembly may be similar to many widely used on tillage tools.

Turning again to FIG. 1, the applicator sweep assembly 50 and its mounting, the main mounting shank 3, is attached to the spring reset assembly 1 by a bracket 30 mounted to a pivot pin 31 inserted through the shank mounting plates 4*a*. Applicator sweep assembly 50 is bolted to the mounting shank 3 with an upper bolt 57 and a lower bolt, 58, which is a shear bolt which is sheared when a shelf rock is encountered. The applicator sweep assembly 50 includes a steel casting and a sweep shank 54 which has a flat, vertical portion having a thickness of less than about 0.5 inches, and which is bolted to a lower, offset portion 3*a* of the mounting shank 3 by aforementioned mounting bolts 57, 58, as seen in FIG. 4. Thus, when viewed along the direction of travel, the center of the sweep shank 54 is aligned with the center of the main portion of the mounting shank 3, and the two overlap in side-by-side relation. This, coupled with the location of the mounting bolts 57, 58 just above the soil level, diagrammatically represented as S in FIG. 1, permits the main mounting shank 3 to be wider and thus stronger, while the sweep shank can be narrower and thus provide operational advantages, as will be clear to those skilled in the art. As shown in FIGS. 3 and 4, the lower forward portion of the sweep shank 54 includes a tip casting 74 welded to it or formed integrally with it. A forward tip portion 64 of tip casting 74 is supported by a steel casting tip 51. This abrasion resistant steel casting tip 51 is comprised of a somewhat brittle material. The steel casting tip 51 provides support for the forward tip portion 64 when it strikes rocks.

Referring to FIG. 3, left and right wings 56*a* 56*b* are shown extending from a lower portion of applicator sweep assembly 50 aft of steel casting tip 51 to slightly lift the soil and provide a horizontal space for the slurry to spread out and disburse laterally behind the sweeps on both sides of the shank. These spaces receive and disburse the delivered slurry with minimum soil disturbance. Specifically, the left and right wings 56a, 56b preferably have an elevation angle of less than about 12 degrees with the horizontal. Left and right lateral extensions 68a and 68b are disposed on casting near the soil surface to further widen the slot in the soil and the slurry tube 52 widens the slot additionally, facilitating the delivery of the slurry in the vertical slot. A mounting hole for the slurry delivery tube 52 is cast in the rear portion of the steel casting of sweep shank 54 to mount the slurry tube with a bolt 59 as shown in FIG. 1. Slurry delivery tube 52 has a discharge tube which is flattened on its sides to fit in the formed furrow. Tabs 55 are welded to the front of slurry delivery tube 52 to receive a bolt 59 carried by the hole in the rear of the casting of sweep shank 54 to form a pivot. Slurry delivery tube 52 pivots about bolt 59 so that if the lower attachment shear bolt 58 shears upon impact with an obstruction, slurry delivery tube 52 will pivot rearwardly and upwardly to avoid jamming a hose (not shown) attached to an upper portion of slurry delivery tube when the unit is installed on the wagon or toolbar that carries the slurry.

The sweep shank 54 is preferably approximately ½ in. thick, but the width may vary from about ⅜ inch to about ¾ inch. For higher rates of application involving lower speeds, the sweep shank's width may exceed ¾ inch. However, in many soil conditions this would increase soil disturbance. A lower discharge portion 53 of slurry delivery tube 52 is flattened sideways to facilitate the flow of slurry in the narrow furrow formed by the sweep shank 54 of the applicator sweep assembly 50.

Of significance, mounting shank 3 extends rearwardly and is curved and extends downwardly to a location near, but above, the soil surface S. This permits the sweep shank 54 to be short in its vertical dimension. That is, sweep shank 54 extends from the operating depth to a few inches above the soil, as opposed to a foot or more above the soil. Therefore, bending of the sweep shank 54 is not a significant problem even though it is only approximately ½ inch thick. Also, to allow the applicator sweep assembly 50 with the steep sloping wings 61 shown in FIG. 3 to move laterally when striking rocks, a spring bolt pivot bushing 70 has a larger inside diameter than the outside diameter of pivot bolt 4, as shown in FIG. 1. This allows for additional lateral movement of applicator sweep assembly 50 so as to reduce lateral forces exerted on sweep shank 54, allowing for the formation of a thinner vertical portion of the furrow.

The lift action of the applicator assembly's wings 56a, 56b is slight, not pronounced. This lift action forms an opening near the surface of the soil slightly wider than the width of mounting shank 3, and bulges, or extensions, 68a and 68b cooperate to widen the slot in the soil near the surface. The applicator assembly's wings 56a, 56b sweep outward and rearward providing a slight lift to the soil in forming a horizontal cavity or soil fissure for promoting lateral flow of the slurry. The wings 56a, 56b have sharpened leading edges 61, and are formed sharply rearwardly in a V-shape to more gently lift the soil.

Figure 2:
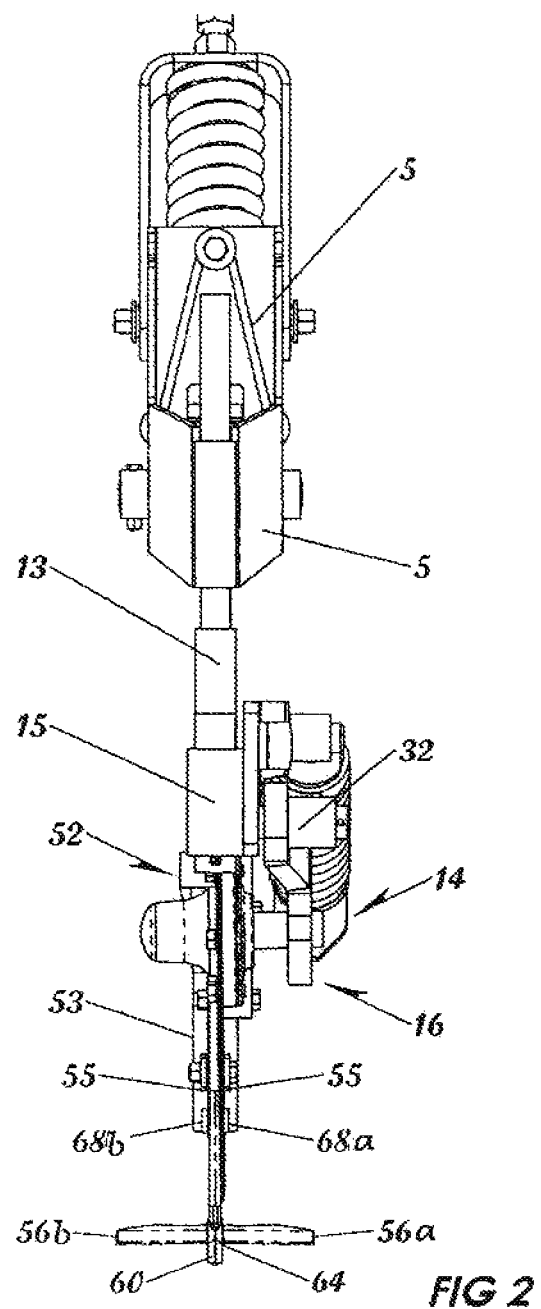

FIG. 2 is a front view of the slurry fertilizer applicator showing the casting's lateral extensions 68a, 68b and assembly mounting bracket 5. It will also be observed from FIGS. 2-4 that the lateral extensions 68a, 68b on each side of the casting of applicator sweep assembly 50 are disposed slightly below the soil surface and that the slurry delivery tube 52 widens the slot further, facilitating the delivery of the slurry in the vertical slot with minimal soil disturbance.

Figure 3:
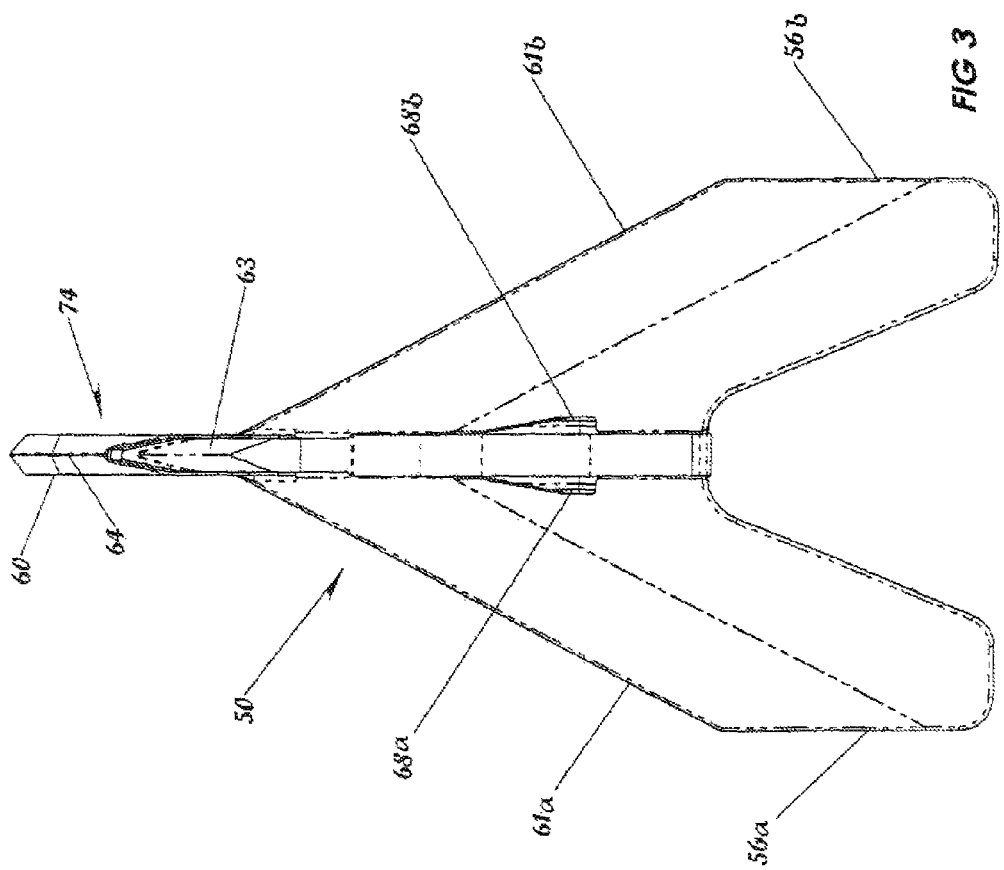

FIG. 3 is a top view of the applicator sweep assembly 50 with its tip casting 74 and slurry delivery tube 52 omitted for clarity.

The applicator sweep assembly's wings 56a, 56b are shown in FIG. 3 as swept rearward (viewed from the top) at 62 degrees, and are shown in FIG. 1 as angled upwardly only slightly in proceeding from front to rear, as described. In many soil conditions, testing has shown less soil disturbance with the 62 degree angle swept back versus 55 degrees as described in U.S. Pat. No. 6,973,884. In some soil conditions, a lesser degree of wing rearward sweep does not have an adverse effect on soil movement. However, a 62 degree angle creates less disturbance in most soil conditions.

Figure 4:
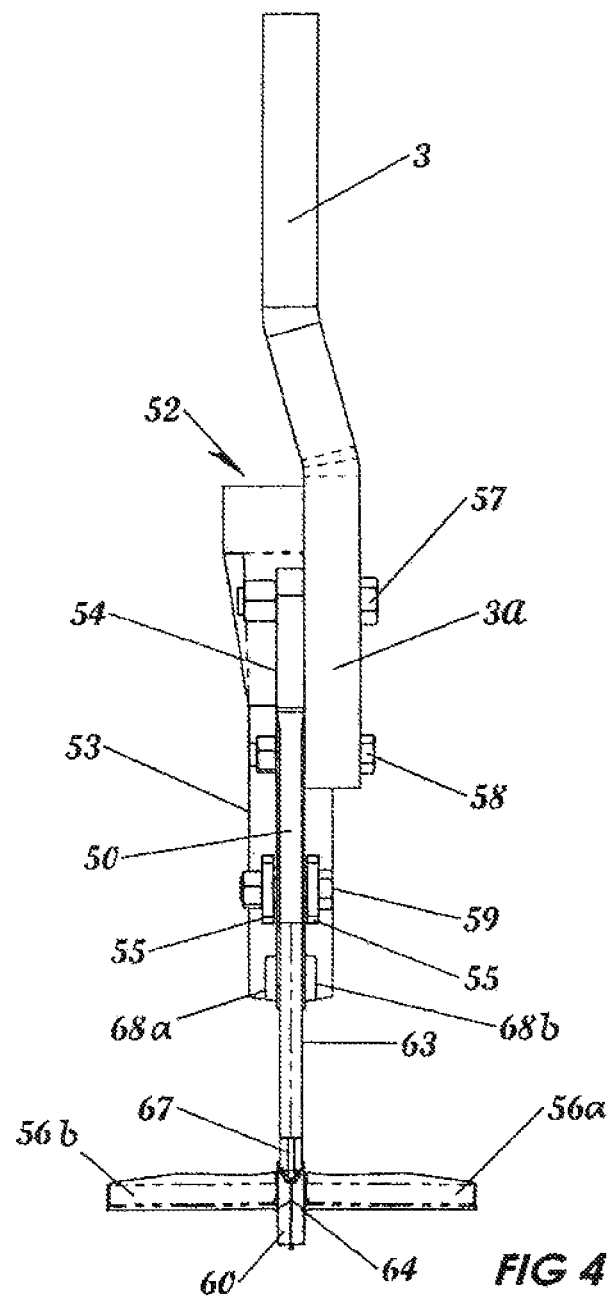

FIG. 4 is a front view of the applicator sweep assembly 50 showing the slurry delivery tube 52 and an offset portion 3a formed at the lower, distal end of the curved mounting shank 3 for mounting the center of sweep shank 54 in vertical alignment with the center of the upper portion of the main mounting shank.

Figure 5:
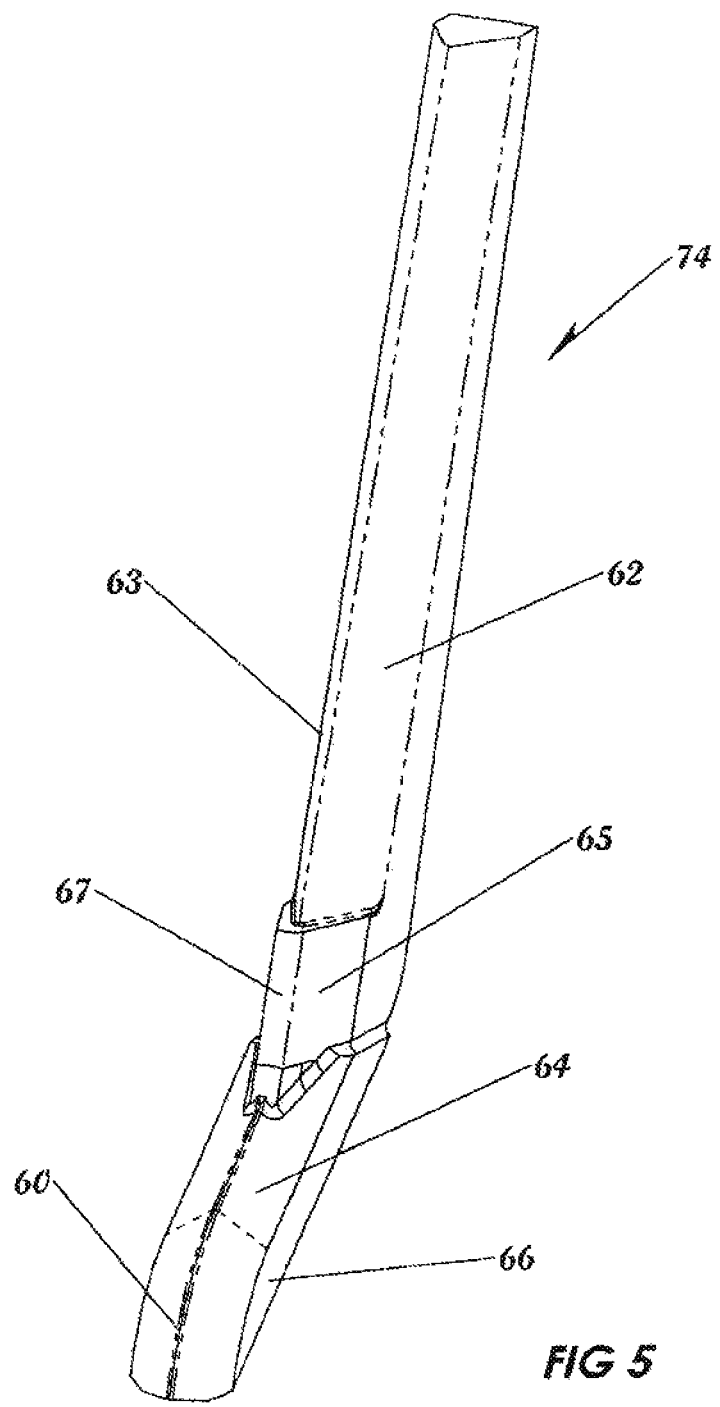

Turning now to FIG. 5, tip casting 74, which may be of hardened steel or other abrasion-resistant material, includes an upper portion 62 with a sharp leading edge 63 to gently part the soil and a lower nose portion 60 centered behind the coulter blade 18. At the rear of the forward nose portion 60 is a low lift angle, forward protruding portion 64 to further lift and part the soil without major soil disturbance. The primary purpose of the vertical portion 63, which has a sharp leading edge 63, is to gently part the soil near the surface. The lower portion 65 of the vertical leading edge 63 extends forward of an upper portion of the leading edge because more wear will occur on the lower portion directly above the forward tip portion 64. The leading edge 67 is rounded for improved wear. This prevents a notch effect of wear in the lower portion 65 of the vertical leading edge 63. Of importance, the lower leading nose portion 60 is more vertical than the portion 64 that is at a low sloping angle directly behind the leading nose portion. This shape creates minimum soil disturbance while providing a chisel point to penetrate hard or frozen soil.

In the alternative, sweep shank 54 could be preformed in the desired shape as represented by the front and lower surfaces of the disclosed tip casting 74, and its width; and a hard surface such as of welding wire applied to all the forward, soil-engaging surfaces.

Having thus disclosed in detail one embodiment of the invention, persons skilled in the art will be able to modify certain of the structures shown and to substitute equivalent elements for those disclosed while continuing to practice the principle of the invention. It is, therefore, intended that all such modifications and substitutions be covered as they are embraced within the spirit and scope of the claims.

I claim:

1. Apparatus for applying slurry fertilizer in a furrow beneath the surface of soil comprising:
    a mounting frame;
    a curvilinear main shank having an upper forward portion including a first end mounted to said mounting frame for rotation about a horizontal axis, said main shank further having a lower aft portion extending downwardly and rearwardly from said upper forward portion and including a second opposed end disposed adjacent the surface of said soil, wherein said lower aft portion is laterally offset from said upper forward portion relative to a direction of travel of said apparatus;
    a spring mounted to said mounting frame at one end and to said main shank at a second location to cushion said main shank;
    a sweep shank attached to the offset lower aft portion of said main shank and aligned with the upper forward portion of said main shank and having a width no greater than approximately one-half inch in a direction of travel of said apparatus, said sweep shank having a forward tip casting disposed below the surface of the soil and including a lower leading tip portion and an upper sharp leading edge portion aligned generally vertically and extending upwardly and aft of said lower leading tip portion for forming a vertical slot in the soil;

a sweep disposed on said sweep shank and in said vertical slot in the soil and having left and right lateral wings extending in a substantially horizontal plane for forming left and right lateral fissures extending outwardly from opposed sides of a lower portion of said slot, wherein said wings are swept back at an angle of at least 55° and are angled upwardly at an angle up to approximately 12° in proceeding from front to rear; and a slurry delivery tube pivotally attached to and disposed aft of said sweep shank for delivery of slurry into the formed furrow, said slurry flowing into said lateral fissures.

2. The apparatus of claim 1 further comprising a spring-loaded coulter disposed forward of and in line with said sweep for cutting an initial slot in residue disposed on the surface of the soil in forming a parting line in the soil in advance of said sweep.

3. The apparatus of claim 2, wherein said spring-loaded coulter is attached to said mounting frame forward of said main shank and said sweep shank.

4. The apparatus of claim 1, wherein said sweep shank is attached to said main shank at a point on said main shank located above the surface of the soil.

5. The apparatus of claim 1, wherein said sweep shank is attached to said main shank by at least one bolt, wherein said one of said bolts is a shear bolt for allowing said sweep shank to deflect away from an object in a field upon impact with said object.

6. The apparatus of claim 5, wherein said sweep shank deflects upwardly upon impact with an object in a field.

7. The apparatus of claim 1, wherein the widths of said sweep shank, said sharp leading edge portion, and said main shank in the direction of travel of said apparatus are substantially equal.

8. The apparatus of claim 1, further comprising at least one tab rigidly attached to said slurry delivery tube and having an aperture therein, said apparatus further comprising a bolt inserted through said aperture and attached to said sweep shank for pivotally coupling said slurry delivery tube to said sweep shank to allow pivoting displacement of said slurry delivery tube upon impact with an obstruction in the soil.

9. The apparatus of claim 1, wherein said sweep shank includes right and left lateral extensions disposed forward of said slurry delivery tube and extending downward from the surface of the soil for widening the slot in the soil and facilitating delivery of the slurry in the slot.

10. The apparatus of claim 1, wherein said slurry delivery tube includes a lower discharge tube portion having left and right flat lateral walls to facilitate positioning of said slurry delivery tube in said vertical slot.

11. The apparatus of claim 1, wherein each of said left and right lateral wings of said sweep is provided with a respective sharp leading edge.

12. The apparatus of claim 1, wherein said lower leading tip portion of said sweep shank includes a lower leading nose portion and an upper sloping angled portion, and wherein said lower leading nose portion is more vertical than said upper sloping angled portion to facilitate soil penetration while minimizing soil disturbance.

13. The apparatus of claim 1, wherein said sweep shank includes a round leading edge portion disposed intermediate said lower leading tip portion and said upper sharp leading edge portion for improved wear resistance.

14. Apparatus for applying slurry fertilizer in a furrow beneath the surface of soil comprising:
a mounting frame;
a curvilinear main shank having an upper forward portion including a first upper end attached to said mounting frame, a lower aft portion extending downwardly and rearwardly from said upper forward portion and a second opposed end disposed on the end of said lower aft portion adjacent the surface of the soil;
a sweep shank attached to the second opposed end of and aligned with said curvilinear main shank and having a width no greater than approximately one-half inch in a direction of travel of said apparatus, said sweep shank having a forward tip casting disposed below the surface of the soil and including a lower pointed, leading tip and an upper, generally vertical leading edge aligned with and extending upward from said pointed, leading tip for forming a vertical slot in the soil;
a sweep disposed on a lower portion of said sweep shank and in said vertical slot and having left and right lateral wings extending outwardly from opposed sides of a lower portion of said slot, said left and right wings further extending upwardly in proceeding from front to rear at an angle up approximately 12° relative to horizontal and rearwardly swept back in a V-shape for forming left and right lateral fissures extending from said slot;
a slurry delivery tube pivotally coupled to and disposed aft of said sweep shank for delivery of slurry into the formed furrow, said slurry flowing into said lateral fissures; and
mounting means coupling said main shank to said mounting frame for allowing pivoting displacement of said main shank in a generally vertical direction and lateral displacement of said main shank relative to a direction of travel of said apparatus.

15. The apparatus of claim 14, wherein said mounting means includes the combination of a spring, a bolt having an outer diameter and a bushing having an inner circular aperture for pivotally coupling said main shank to said mounting frame, wherein said spring urges said main shank in a downward direction toward the soil, and wherein said bolt is received in the inner circular aperture of said bushing and the diameter of said inner circular aperture is greater than the outer diameter of said bolt to allow for lateral deflection of said sweep as said sweep is displaced through the soil.

16. Apparatus for applying slurry fertilizer in a furrow beneath the surface of soil comprising:
a mounting frame;
a coulter assembly mounted to said mounting frame and including a spring-biased coulter for parting the soil and cutting residue at or near the surface of the soil;
a curvilinear main shank aligned with and disposed aft of said coulter assembly relative to a direction of travel of said apparatus and having an upper forward portion including a first end mounted to said mounting frame for rotation about a horizontal axis, said main shank further having a lower aft portion extending downwardly and rearwardly from said upper forward portion and including a second opposed end disposed adjacent the surface of said soil, wherein said lower aft portion is laterally offset from said upper forward portion relative to a direction of travel of said apparatus;
a spring mounted to said mounting frame at one end and to said main shank at a second location to cushion said main shank;

a sweep shank attached to the offset lower aft portion of said main shank and aligned with the upper forward portion of said main shank and having a width no greater than approximately one-half inch in a direction of travel of said apparatus, said sweep shank having a forward tip casting disposed below the surface of the soil and including a lower leading tip portion and an upper sharp leading edge portion aligned generally vertically and extending upwardly and aft of said lower leading tip portion, said sweep shank including right and left lateral extensions disposed forward of said slurry delivery tube and extending downward from the surface of the soil for widening the slot in the soil and facilitating delivery of the slurry in the slot;

a sweep disposed on said sweep shank and having left and right lateral wings extending in a substantially horizontal plane for forming left and right lateral fissures, wherein said wings are swept back at an angle of at least 55° and are angled upwardly in proceeding from front to rear at an angle less than approximately 12° relative to horizontal; and a slurry delivery tube pivotally attached to and disposed aft of said sweep shank for delivery of slurry into the formed furrow, said slurry flowing into said lateral fissures.

* * * * *

UNITED STATES PATENT AND TRADEMARK OFFICE
CERTIFICATE OF CORRECTION

| | | |
|---|---|---|
| PATENT NO. | : 8,544,395 B2 | Page 1 of 1 |
| APPLICATION NO. | : 12/902983 | |
| DATED | : October 1, 2013 | |
| INVENTOR(S) | : Dietrich | |

It is certified that error appears in the above-identified patent and that said Letters Patent is hereby corrected as shown below:

In the Claims:

Claim 14, Column 8, Line 26, insert --to-- after up

Signed and Sealed this
Tenth Day of February, 2015

Michelle K. Lee
*Deputy Director of the United States Patent and Trademark Office*